United States Patent Office 3,533,756
Patented Oct. 13, 1970

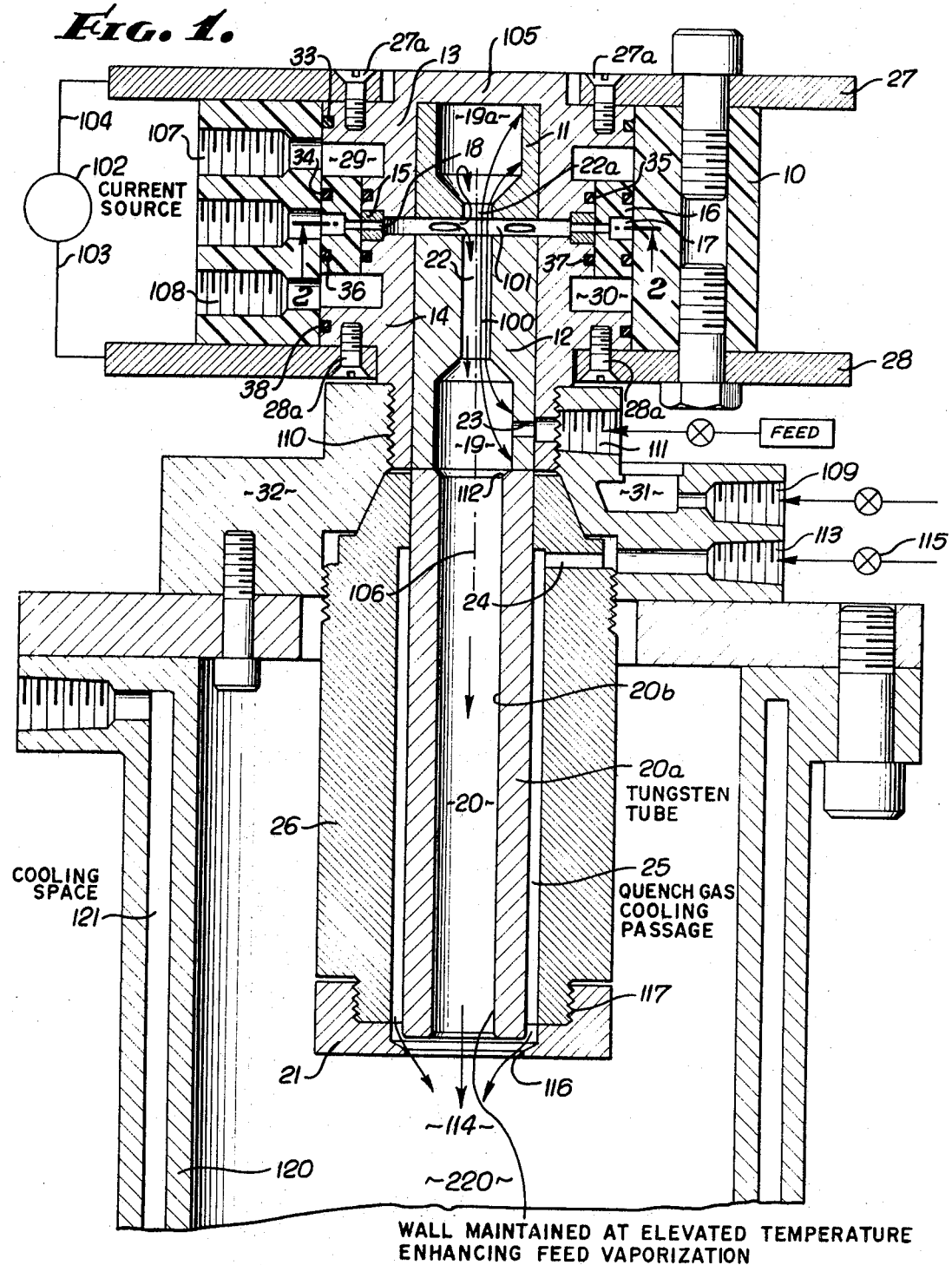

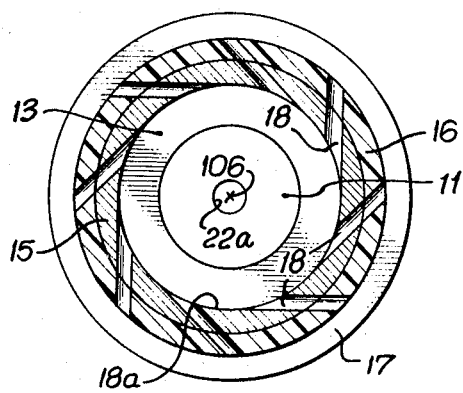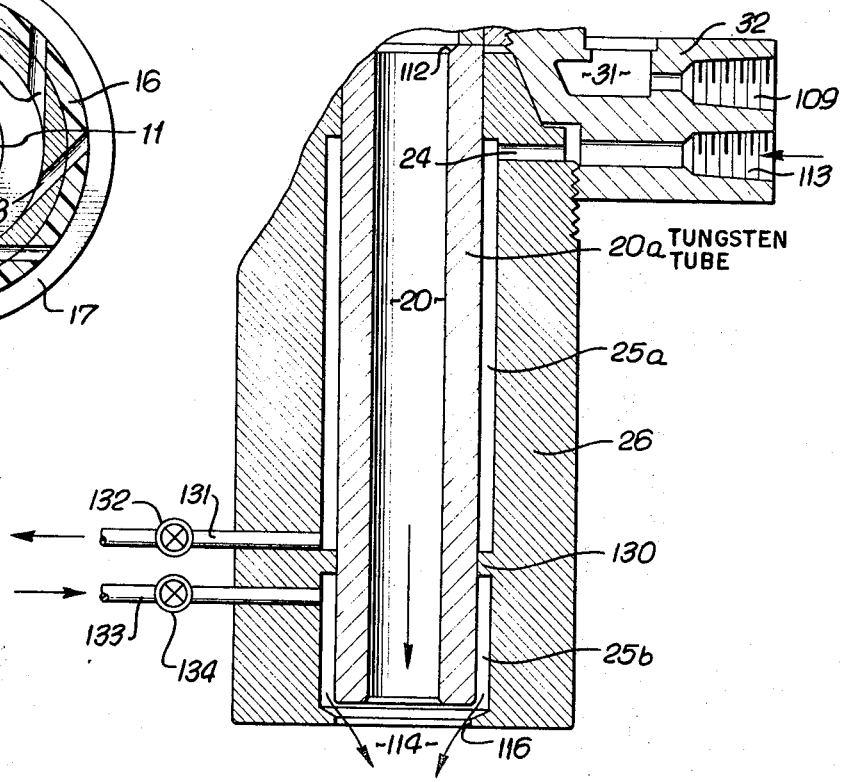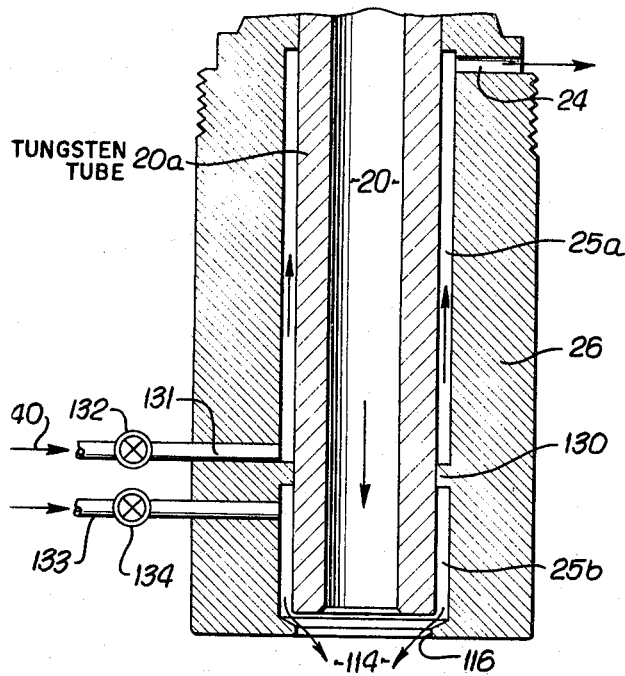

3,533,756
SOLIDS ARC REACTOR METHOD
John Houseman, Newport Beach, Calif., assignor, by mesne assignments, to Hercules Incorporated, a corporation of Delaware
Filed Nov. 15, 1966, Ser. No. 594,598
Int. Cl. B01d 7/00
U.S. Cl. 23—294                                             12 Claims

ABSTRACT OF THE DISCLOSURE

This invention concerns method and apparatus useful in carrying out hot plasma gas treatment of divided solid materials as well as other chemical reactions. According to the process, a solid particle feed is contacted with hot plasma gas, the feed and gas are caused to flow through an elongated residence zone under conditions such as to enhance vaporization of the feed, and the vaporized feed is condensed in the form of a finely divided powder product. The apparatus includes anode and cathode elements forming passages for reception of an arc discharge pattern penetrating these elements and for passing gas flow through one element while blocking gas flow through the other element, together with means to establish the arc discharge pattern. The structure typically forms an elongated vaporization zone to receive the feed and gas from the one element, and being of sufficient length to assure enhanced vaporization of the feed in that zone.

---

This invention relates generally to hot plasma gas treatment of divided solid materials. More particularly, the invention concerns unusually effective method and apparatus for carrying out such treatment, useful for example in carrying out high temperature chemical reactions, particularly those in which a high melting point solid is vaporized and allowed to react with gases or other high melting point solids. One example is the production of very finely divided particles such as silica powder.

Submicron silica powder has in the past been produced by a process that includes the step of hydrolyzing silicon tetrachloride. As a result, the product tends to contain traces of adsorbed water and hydrogen chloride. With powders having large surface areas, small amounts of adsorbed materials can have a marked and often undesirable influence on properties such as wettability, mixing characteristics in polymers, viscosity in solutions, etc. Experiments undertaken in an effort to avoid such contamination have been directed toward vaporization and subsequent recondensation of solid material as a finely divided powder; however, such experimental efforts have encountered considerable difficulties when the melting points of solid materials are high, i.e. over 1000° C. as in the case of silica.

It is a major object of the present invention to provide process and apparatus characterized as overcoming the above mentioned difficulties, and particularly as regards reducing the size of solid particles. Basically, the process steps include effecting contact of a solid particle feed with a hot plasma gas, flowing the feed and gas through an elongated residence zone and maintaining the feed at sufficiently elevated temperature in that zone to substantially enhance vaporization of the feed therein, and condensing the enhanced vaporized feed in the form of a finely divided powder product. In this regard, maintenance of the feed at elevated temperature is typically carried out by maintaining the boundary of the elongated residence zone at elevated temperature; and the effecting step is typically carried out by establishing an electric arc discharge, introducing gas such as nitrogen into the discharge, and introducing the feed into the gas. As will be seen, the function of the residence chamber is to provide sufficient residence time for the feed powder and the hot plasma gas to come to equilibrium, i.e., complete vaporization of the feed powder. Since a hot plasma gas radiates energy at a high rate, the hot walls of the residence chamber reduce radiant heat losses and the high plasma temperature is maintained. In handling a hot gas stream containing vaporized silica, a great deal of trouble is often encountered by the silica condensing out on cold surfaces and thereby plugging the gas passages. The hot walls of the residence chamber effectively overcome this problem.

The condensing step typically includes contacting the enhanced vaporized feed with cool quench gas; flow of the latter into the vaporized feed for example may be controlled to achieve size control of the powder product ultimately separated from the gas. In this regard, by intimately contacting the hot products with a cold stream of gas, a high cooling rate is obtained resulting in the condensation of silica powder in very finely divided form. The powder in the quench product gas may be separated by conventional means like cyclones, filter bags and electrostatic precipitators, and the resulting powder-free gas can be recompressed and recycled as plasma gas and quench gas. Accordingly, it will be seen that the invention provides a new and uncontaminated type of submicron powder from coarse (5 to 500 micron) particles by means of a new process for vaporizing and recondensing high boiling point solids in a novel plasma-arc reactor. Such solids include, for example, silica, magnesia, zirconia, alumina, and metals such as iron, aluminum, copper, nickel and alloys thereof.

In its apparatus aspects, the invention is defined by structure including anode and cathode elements forming passages for reception of an arc discharge pattern penetrating the elements and for passing the flow of gas through one of the elements, said structure blocking flow of gas through the other of the elements, and means to cause electrical current to flow in the elements and to create the arc discharge pattern. The structure typically forms an elongated vaporization zone communicating with the passage in the one element for receiving the feed and gas and being of sufficient length for assuring enhanced vaporization of the feed flowing in the vaporization or residence zone. The walls of the latter are purposely kept hot to provide for the desired enhanced vaporization of the feed in order to achieve the submicron powder product. In this regard, the feed and gas are typically initially delivered separately or together and via porting in the structure to flow in at least one of the passages upstream of the residence or vaporization zone and proximate the arc discharge, as will be seen. The apparatus is also usable in processes where the residence zone serves primarily to promote chemical reactions other than vaporization enhancement of a powder feed.

Additional features of the apparatus include the provision of means to introduce quench fluid into the path of hot gas delivered downstream in response to flow within the vaporatization zone for effecting condensation of the vaporized feed; the provision of means to control such introduction of quench fluid to maintain the boundary of the vaporization zone at sufficiently elevated temperature as to control (i.e. inhibit or stabilize) condensation of the feed at the boundary, and also to control the size of the product powder; provision for separation of the product powder from the quench gas; provision for preheating of the feed by passage through ducting in heat exchange relation with the vaporization zone; and provision for separate cooling of the latter zone.

These and other object and advantages of the invention, as well as the details of an illustrative embodiment, will be more fully understood from the following detailed description of the drawings, in which:

FIG. 1 is a vertical cross section taken through one preferred form of processing apparatus operable in accordance with the invention;

FIG. 2 is a cross section taken on line 2—2 of FIG. 1; and

FIGS. 3 and 4 are fragmentary cross sections of modified forms of the FIG. 1 apparatus.

Referring first to FIG. 1, the apparatus shows structure including anode and cathode elements 11 and 12 forming passages for reception of an arc discharge pattern 100 penetrating the elements and for passing the flow of gas through one of the elements, as for example the cathode 12. The electrode elements may typically consist of tungsten, and they are set in sleeves 13 and 14 which may typically consist of copper. The passages referred to include the throat regions 22 and 22a, and the enlargements 19 and 19a, passage enlargement 19 defining a mixing chamber, the function of which will be described.

A refractory gas ring 15, as for example may be made of alumina, is set in a gas ring holder 16, which may consist of Teflon, and isolates the electrodes from each other as well as allowing introduction of a working gas from a plenum chamber 17 through the gas ring holes or ports 18. From the latter the gas passes through the space 101 between the faces of the electrodes to enter the passages referred to above. Gas circulating into the passage 19a returns centrally into the throat 22 along with the gas passing directly into the throat, for travel downstream into the mixing zone 19.

An arc discharge 100 is established between the electrodes as indicated by the arrows, and the gas passing through the arc discharge is heated to a high temperature to form a plasma. For example, the plasma temperature may be well above 1000° C., and in the processing of silica as will be described the plasma temperature is above 2000° C. The arc discharge may be established by means for conducting electrical current to the electrodes, such means including the source 102 of electric current (DC or AC) and the lines 103 and 104 connecting the source with the plates 27 and 28 to which the sleeves 13 and 14 are attached as indicated at 27a and 28a. The sleeves are, of course, in electrical contact with the electrodes. The assembly is retained within a housing 10 which may consist of nylon.

The arc discharge pattern penetrates both of the electrode elements; however, the passage 19a in the electrode 11 is plugged at 105 as by an extension of the sleeve 13, whereby gas entering the passage 19a cannot flow endwise therethrough. Accordingly, all of the gas must flow through the cathode 12 and into the mixing zone 19 for vaporizing the feed, as will be described. On the other hand, the ability of the arc discharge to penetrate the passages in both the anode and cathode, and terminating within the enlarged passage sections therein promotes variable or unstable attachment of the arc to the electrode surfaces. Such unstable attachment is enhanced by the flow of gas within the passage enlargements 19 and 19a, for the purpose of reducing any tendency for high temperature erosion of the electrode surfaces. Typically, the arc oscillates between the different arc attachment points illustrated.

As shown in FIG. 2, the gas ring holes 18 extend substantially tangentially relative to a circle 18a having as its center the axis 106 of the structure, whereby the working gas is introduced with vortex motion, enhancing the inherent movement of the arc attachment points to the electrodes. As a result, the arc rotates about the center axis 106 as well as oscillating relatively therealong, and the length of the arc can be varied to some extent by varying the flow rate of the working gas, as for example nitrogen. High temperature erosion of the electrodes is further inhibited by water cooling. For example, cooling water may be circulated via porting 107 and 108 through the annular passages 29 and 30 in the electrodes. Adapter flange 32, which may be made of copper, is cooled by water circulated through passage 31 therein, access thereto being gained via porting 109. Adapter flange 32 is shown as having thread connection at 110 to an extension of the sleeve 14.

The structure forms porting 111 to deliver feed material in divided form to flow in at least one of the passages formed by the electrodes, and typically downwardly therein inasmuch as the center line 106 is preferably vertically oriented. In this regard, the feed powder is typically entrained in a carrier gas such as nitrogen, the stream being injected through the ports 23 in the electrode 12. For example, radial injection ports result in good mixing of the feed with the hot working gas in the mixing chamber or passage 19. Preferably, the feed ports 23 communicate with the interior of passage 19 proximate the downstream terminus of the arc 100, as shown, whereby the length of the arc is fairly independent of feed rates. Alternately, the feed may be introduced via the plenum 17, inlet 18 and space 101 to flow downstream within the throat 22.

The diameter of the mixing chamber 19 is decreased at 112 downstream of the ports 23, providing additional turbulence of the plasma gas for better mixing of the feed powder and carrier gas therefor with the hot working plasma gas. The mixing chamber is maintained at elevated temperature by avoiding direct water cooling thereof, heat transfer taking place by conduction through the electrode 12 to the sleeve 14 and then to the coolant in the passage 30.

In accordance with an important feature of the invention, the feed and gas are caused to flow through an elongated residence zone, the feed being maintained at sufficiently elevated temperature therein to substantially enhance vaporization of the feed for producing the reduced product particle size. As an example of this, the feed flows downwardly through the elongated tubular zone 20 formed by the tube 20a extending from the cathode 12. In this regard, the boundary of the zone 20, as for example the wall 20b of the tube 20a is maintained at elevated temperature, i.e., close to that of the mixing zone temperature, and the length of the zone 20 is predetermined to ensure enhanced vaporization of the feed in order to form the desired submicron sized product. In this regard, if the wall 20b of the residence zone is not maintained at elevated temperature, incomplete vaporization of the feed powder results, and also vaporized feed condenses on the relatively cooler wall. The latter leads to blocking of the gas passage with condensed material, as for example silica, after a short operating time. On the other hand, by maintaining the surface temperature of the wall high enough, a residence time of 0.1 to 1 millisecond is typically sufficient to effect substantially complete vaporization of a 200-mesh feed powder consisting of silica. An excellent material of construction for the tube 20a in tungsten, which resists vaporization at high power inputs.

Gas cooling of the tube 20a avoids any problem of tube interior wall vaporization. Thus for example, gas may be introduced at 113 to flow into the annular passage 25 formed between the tube 20a and a copper cylinder 26. Such gas may for example consist of quench gas passing through port 24 and into the annular passage 25, a quench fitting 21 at the lower end of the cylinder 26 forcing the quench gas toward the vaporized feed discharge from the lower end of the tube 20a at 114. At that point, the quench gas, as for example cool nitrogen, mixes with the vaporized feed and other gas emerging from zone 20, resulting in condensation of the feed in very finely divided form. By varying the flow rate of quench gas, as by manipulation of a valve 115, the rate of cooling of the hot products can be varied and the particle size of the product can be controlled.

Under certain operating conditions it is possible to maintain a thin layer of liquid feed such as silica on the surface 20b, which is beneficial in preventing any contamination of the product powder with vaporized material from the wall of the tube 20a. Such operation would correspond to increased flow of quench gas causing a reduction in temperature of the wall 20b for condensing the feed to maintain a thin layer thereof on that wall. In addition, the operation may be such that the liquid on the wall 20b drains down through the opening 116 in the quench ring 21 and through the quench zone 114 to fall as a slag for collection therebelow. Such a slag can act as a means of effecting the separation of certain impurities in the feed.

It will be noted that the quench fitting 21, which may be made of copper and which is attached at 117 to the lower terminus of the cylinder 26, operates to force the quench gas toward the center line of the tube 20a, where it mixes with the hot products emerging therefrom, thereby resulting in condensation of the enhanced vaporized feed in very finely divided form. By varying the flow rate of quench gas, the rate of cooling of the hot products can be varied and the particle size of the product can be controlled.

While the upper electrode 11 may be either the anode or cathode, it has been found that better operation is obtained by making the upper electrode the anode, and the lower electrode the cathode. As a result, a larger arc is obtained within the passages 22 and 19 of the cathode, resulting in higher thermal efficiency. Normally, the lower or cathode electrode 12 is grounded where the source 102 provides direct current for operation. Various rubber O-rings 33–38 prevent cooling water and gas streams from leaking into and out of their respective passages, as illustrated.

Below the quench ring 116 the quenched products travel downwardly through a tubular body 120 forming a travel zone 220. The tubular body 120 is cooled by means of cooling water flowing through an annular space 121. Means to separate out the condensate finely divided powder may take the form of a screen or bagging suitably attached to the fitting 120.

Another major feature of the invention relates to the extremely low erosion rate of the electrodes and the walls of the mixing and hot residence chambers. If erosion does take place, it often imparts a color to the product powder. For instance: with copper erosion and silica feed, the product may show a purple-reddish color. With tungsten erosion, the product may show a bluish color. The invention provides an apparatus that enables the manufacture of fine product powder with the same color as the coarse starting material.

In actual operation of the form of the invention seen in FIGS. 1–3, nitrogen gas was used as working gas, powder carrier gas and quench gas and a white quartz sand powder (−200 mesh) was used as feed to produce submicron silica powder. The following tabulation indicates the results from various runs:

TYPICAL OPERATING PARAMETERS FOR SMALL-SIZED VERSION OF APPARATUS

| Run No. | 1[1] | 2[1] | 3 | 4 | 5 |
|---|---|---|---|---|---|
| Open circuit voltage | 800 | 800 | 800 | 800 | 800 |
| Running voltage (volts) | 250 | 250 | 290 | 260 | 225 |
| Running current (amperes) | 90 | 80 | 100 | 84 | 90 |
| Input power, kw. DC | 22.5 | 20.0 | 29.0 | 21.8 | 20.2 |
| Gas flows: | | | | | |
| Working gas, nitrogen, s.c.f.h. | 120 | 135 | 125 | 135 | 110 |
| Powder carrier gas, nitrogen, s.c.f.h. | 145 | 150 | 50 | 45 | 45 |
| Quench gas, nitrogen, s.c.f.h. | 330 | 550 | 320 | 620 | 200 |
| Feed power rate, −200 mesh silica, lb./hr. | 2.1 | 11.0 | 2.0 | 0.9 | 1.5 |
| Pressure at input to gas ring (p.s.i.g.) | 40 | 30 | 32 | 25 | 32 |
| Exit pressure measured just downstream of electrode (p.s.i.g.) | 5 | 5 | 6 | 4 | 4 |
| Product properties: | | | | | |
| Surface area, m.²/gm. (B.E.T. nitrogen adsorption) | 108 | 282 | 129 | 240 | 120 |
| Particle size range, millimicron | 20–110 | 10–70 | 10–250 | 20 200 | |
| Pore volume | 0.23 | 0.66 | | | |
| Kwh./lb. of silica | 11 | 20 | 14.5 | 24.2 | 13.5 |

[1] Carrier gas with feed powder added to working gas and passed through gas ring.

Referring now to FIG. 3, the modification illustrated shows a passage between elements 20a and 26 divided by an annular wall 130. The upper portion 25a of the passage passes coolant downwardly therein for removal via a duct 131 valve controlled at 132. Quench fluid is introduced via line 133 and valve 134 to the lower portion 25b of the passage between elements 20a and 26, for discharge into the quench zone 114 as described above. As before, the hot products travel downwardly within the residence zone 20. As a result, control of quench fluid flow for controlling particle size may be isolated from control of heat transfer between the products flowing within the residence zone and the cooling fluid flowing in passage 25a.

FIG. 4 shows another modification, similar to that seen in FIG. 3 and therefore bearing the same numbers for the same parts. In this instance, the coolant fluid takes the form of feed powder entrained in a carrier gas delivered at 140 to the valve 132 and line 131. The feed plus carrier then flows upwardly within the upper passage 25a to discharge at the port 24 for cycling to the feed inlet at 23 or 17, as described above. In this manner, the feed may be preheated by the hot products flowing within the residence zone for higher efficiency.

I claim:

1. In the process of reducing the size of a particle feed, the steps that include establishing an electric arc between aligned tubular electrodes into the bore of which the arc penetrates for attachment to said bores, introducing fluid into the arc in a whirling path transverse to the arc to produce a hot plasma gas, the hot plasma gas then flowing within and beyond the tubular electrodes, introducing said feed into the arc for entrainment in said hot plasma gas, flowing the feed and gas through the length of an elongated residence zone which exceeds the arc length, flowing quench gas in a space extending in substantially surrounding relation to said zone and for a substantial distance along the length of said zone, maintaining the feed at sufficiently elevated temperature in said zone by confinement therein to substantially enhance vaporization of the feed therein, and condensing the enhanced vaporized feed in the form of a finely divided powder product by flowing the quench gas in surrounding relationship to the feed and plasma following discharge from the residence zone, and directing the quench gas flow angularly into the path of the discharge.

2. The process of claim 1 in which said maintenance of the feed at elevated temperature in said zone is carried out by controlling heat transfer from the boundary of said zone thereby maintaining the boundary of said zone at elevated temperature.

3. The process of claim 1 wherein said feed consists of silica.

4. The process of claim 3 including controlling heat transfer from the boundary of said zone to maintain said boundary at sufficiently elevated temperature as to inhibit silica condensation at the boundary.

5. The process of claim 3 including maintaining a film of liquid silica at the boundary of said zone to prevent contamination of said product.

6. The process of claim 1 wherein the bulk of the condensed product consists of powder particles of less than 1 micron size.

7. The process of claim 1 wherein carrier gas is introduced into the arc with said feed entrained therein.

8. The process of claim 7 in which the carrier gas consists of nitrogen.

9. The process of claim 1 wherein said fluid is introduced into the arc at a first location and so as to unstabilize the arc, and said feed is introduced into the arc at a second location downstream of said first location.

10. The process of claim 1 including flowing said feed in heat transfer relation to said zone to pre-heat the feed.

11. The process of claim 12 including separating the finely divided powder product from the quench gas.

12. The process of claim 1 including the step of controlling the flow of quench gas to control the size of the powder product.

References Cited

UNITED STATES PATENTS

| | | | |
|---|---|---|---|
| 2,265,180 | 12/1941 | Maier | 23—294 |
| 3,010,009 | 11/1961 | Ducati | 117—93.1 |
| 3,082,314 | 3/1963 | Yoshiaki | 117—93.1 |
| 3,114,826 | 12/1963 | Sullivan | 117—93.1 |
| 3,211,548 | 10/1965 | Scheller | 117—93.1 |
| 3,212,914 | 10/1965 | Lyle | 117—93.1 |
| 3,246,114 | 4/1966 | Matvay | 117—93.1 |
| 3,275,408 | 9/1966 | Winterburn | 117—93.1 |

OTHER REFERENCES

Materials Progress, March 1963, pp. 105–108, Leroy Davis.

NORMAN YUDKOFF, Primary Examiner

U.S. Cl. X.R.

65—21; 117—93.1, 106; 219—121